United States Patent
Zhang et al.

(10) Patent No.: US 11,259,163 B2
(45) Date of Patent: Feb. 22, 2022

(54) DATA TRANSMITTING AND RECEIVING METHODS IN A NARROW-BAND COMMUNICATION SYSTEM, TWO-WAY RADIO AND STORAGE MEDIUM

(71) Applicant: AUCTUS TECHNOLOGIES CO., LTD., Guangdong (CN)

(72) Inventors: Wei Zhang, Guangdong (CN); Jiaxiong Feng, Guangdong (CN); Kok Yong Chan, Guangdong (CN)

(73) Assignee: AUCTUS TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/687,741

(22) Filed: Nov. 19, 2019

(65) Prior Publication Data
US 2020/0162874 A1 May 21, 2020

(30) Foreign Application Priority Data
Nov. 20, 2018 (CN) .......................... 201811385502.5

(51) Int. Cl.
*H04W 4/00* (2018.01)
*H04W 4/80* (2018.01)
(Continued)

(52) U.S. Cl.
CPC .............. *H04W 4/80* (2018.02); *H04L 5/0048* (2013.01); *H04W 52/0216* (2013.01); *H04W 52/0274* (2013.01)

(58) Field of Classification Search
CPC ............... H04W 4/80; H04W 52/0274; H04W 52/0216; H04W 52/02; H04L 5/0048; H04L 5/00
(Continued)

(56) References Cited

U.S. PATENT DOCUMENTS 9,191,891 B2 * 11/2015 Jafarian ............. H04W 52/0212
9,743,351 B2 * 8/2017 Jafarian ............. H04W 52/0212
(Continued)

FOREIGN PATENT DOCUMENTS

CN 102056028 A 5/2011

OTHER PUBLICATIONS

El-Holydi A. "Aloha With Preamble Sampling for Sporadic Traffic in Ad Hoc Wireless Sensor Networks", Proceedings of IEEE International Conference on Communications—Apr. 28-May 2, 2002—New York, NY, USA, IEEE, Piscataway, NJ, USA, vol. 5, Apr. 28, 2002 (Apr. 28, 2002), pp. 3418-3423.
(Continued)

*Primary Examiner* — Marceau Milord
(74) *Attorney, Agent, or Firm* — Ballard Spahr LLP

(57) ABSTRACT

The present application provides data transmitting and receiving methods in a narrow-band communication system, a two-way radio and a storage medium. The general idea of the present application is as follows: the two-way radio at the transmitting end firstly transmits a pilot signal, which activates the two-way radio at the receiving end into an operating state; the two-way radio at the transmitting end, after transmitting the pilot signal, transmits data to be transmitted to the two-way radio at the receiving end; the two-way radio at the receiving end, according to the pilot signal, switches the two-way radio at the receiving end into the operating state, and in its operating state receives data transmitted by the two-way radio at the transmitting end. This ensures that the two-way radio at the receiving end may receive data from the two-way radio at the transmitting end in real time, thereby improving the accuracy of data transmitted by the two-way radio at the transmitting end.

20 Claims, 2 Drawing Sheets

(51) Int. Cl.
*H04L 5/00* (2006.01)
*H04W 52/02* (2009.01)

(58) Field of Classification Search
USPC .......................................................... 370/329
See application file for complete search history.

(56) References Cited

U.S. PATENT DOCUMENTS

| | | | |
|---|---|---|---|
| 9,936,442 B1* | 4/2018 | Noonan | C10G 2/33 |
| 10,182,400 B2* | 1/2019 | Khazanov | H04W 52/0219 |
| 10,356,839 B2* | 7/2019 | Ang | H04W 52/0222 |
| 10,615,834 B1* | 4/2020 | Hendershot | H04B 1/034 |
| 10,827,556 B2* | 11/2020 | Ang | H04W 52/0212 |
| 2014/0126442 A1 | 5/2014 | Jafarian et al. | |
| 2015/0036576 A1* | 2/2015 | Jafarian | H04W 52/0212 370/311 |
| 2017/0060599 A1* | 3/2017 | Chen | G06F 3/04842 |
| 2017/0070959 A1* | 3/2017 | Khazanov | H04W 52/0235 |
| 2019/0053161 A1* | 2/2019 | Rao | H04W 52/0229 |
| 2019/0320493 A1* | 10/2019 | Ang | H04W 52/0212 |
| 2020/0112918 A1* | 4/2020 | Meylan | H04W 52/0229 |

OTHER PUBLICATIONS

Federal Communications Commission: "Part 95—Personal Radio Services", Title 47—Telecommunication, Oct. 1, 2009 (Oct. 1, 2009), pp. 527-586, XP55831031, Retrieved from the Internet: URL: https://www.govinfo.gov/content/pkg/CFR-2009-title47-vol5/pdf/CFR-2009-title47-vol5-part95.pdf.

* cited by examiner

DATA TRANSMITTING AND RECEIVING METHODS IN A NARROW-BAND COMMUNICATION SYSTEM, TWO-WAY RADIO AND STORAGE MEDIUM

CROSS REFERENCE TO RELATED APPLICATIONS

This application claims priority under 35 U.S.C. § 119 to Chinese Patent Application No. CN 201811385502.5, filed on Nov. 20, 2018. The contents of this priority application are hereby incorporated by reference in their entirety.

TECHNICAL FIELD

The present application relates to the field of communication technology, and in particular, to data transmitting and receiving methods in a narrow-band communication system, two-way radio and storage medium.

BACKGROUND ART

Data communication between two-way radios is realized by modulating two different frequency signals representing 1 and 0 in an analog channel for the two-way radio. Data transmission for a two-way radio over an analog channel has some advantages, for example, it is easier to implement, it has better anti-noise and anti-attenuation performances, and it is also widely applicable to medium-speed and low-speed data transmission.

Currently, two-way radios, when transmitting data over analog channels, shall conform to the requirements as stipulated FCC (Federal Communications Commission) standard. For low-power civil two-way radios, such as GMRS and FRS types, FCC Part 95 stipulates that a data transmission duration may not be greater than 1 s, i.e. a data transmission duration each time is up to 1 s. However, in practical applications, two-way radios usually employ a power-saving mechanism to save power. The mechanism is realized as follows: when a two-way radio is in a standby state (i.e. the two-way radio is not operated by a user, and in the meantime the channel does not receive a valid signal), it operates for a period of time and sleeps for a period of time, for example, 100 ms for operation and 600 ms for sleeping. Assuming that a two-way radio at a transmitting end transmits data for 1 s, at the moment data is transferred to a two-way radio at a receiving end, the two-way radio at the receiving end is most probably in a sleeping state. Under the circumstances, it will lead to data reception failure for the two-way radio at the receiving end or partial data lost. As a result, it may not guarantee the accuracy of data received by the two-way radio at the receiving end, and in the meantime may affect data volume transmitted.

SUMMARY OF THE INVENTION

In order to solve the above technical problems, the present application provides data transmitting and receiving methods in a narrow-band communication system, a two-way radio and a storage medium, in order to conform to the requirements as stipulated FCC standard and in the meantime to achieve the accuracy of data received by a two-way radio stipulated in FCC Part 95.

In order to solve the above technical problem, the present application provides a data transmitting method in a narrow-band communication system, for data communication between a two-way radio at a transmitting end and a two-way radio at a receiving end, wherein the data transmitting method comprising:

transmitting, by the two-way radio at the transmitting end, a pilot signal to the two-way radio at the receiving end, the pilot signal being used to set the two-way radio at the receiving end into an operating state; and after transmitting the pilot signal by the two-way radio at the transmitting end, transmitting, by the two-way radio at the transmitting end, data to be transmitted to the two-way radio at the receiving end.

In this way, in the data transmitting method in a narrow-band communication system according to the present application, only after the two-way radio at the receiving end is activated into the operating state by the pilot signal, the two-way radio at the transmitting end transmits data. This may ensure that the two-way radio at the receiving end receives data from the two-way radio at the transmitting end in real time, thereby improving the accuracy of data transmitted by the two-way radio at the transmitting end.

A two-way radio herein may also be called a walkie-talkie, or an interphone. A two-way radio herein may refer to a transceiver transmitting and receiving a signal using radio waves. A two-way radio herein may also refer to landline telephone that uses a metal wire or optical fiber telephone line for transmission.

Further, a duration of the pilot signal is not less than a duration of a sleeping state of the two-way radio at the receiving end.

In this way, it is ensured that the pilot signal transmitted by the two-way radio at the transmitting end may reliably wake up the two-way radio at the receiving end.

Further, the data transmitting method further comprising: after transmitting the pilot signal and before transmitting data to be transmitted by the two-way radio at the transmitting end, switching off, by the two-way radio at the transmitting end, a transmitting state of the two-way radio at the transmitting end, and a duration for the transmitting state of the two-way radio at the transmitting end being off is less than a time length for the two-way radio at the receiving end re-entering into a sleeping state from the operating state.

In this way, it is possible to conform well to the requirements stipulated in FCC standard, i.e. a data transmission duration may be not greater than is, and also secures a certain degree of accuracy of data received by the two-way radio at the receiving end and data volume transmitted by the two-way radio at the transmitting end.

Further, the data transmitting method further comprising: after transmitting the pilot signal and before transmitting data to be transmitted by the two-way radio at the transmitting end, waiting for a period of time by the two-way radio at the transmitting end, during the period of time the transmitting state of the two-way radio at the transmitting end is not switched off, and a duration of the period of time is less than a time length for the two-way radio at the receiving end re-entering into a sleeping state from the operating state, and a sum of a duration of the pilot signal, the duration of the period of time and a duration for transmitting data to be transmitted is not greater than a data transmission duration as stipulated in Federal Communications Commission standard.

In this way, a series of problems caused by frequent disconnection of the two-way radio at the transmitting end may be avoided.

Further, the data transmitting method further comprising: immediately after transmitting the pilot signal by the two-way radio at the transmitting end, transmitting, by the two-way radio at the transmitting end, data to be transmitted to the two-way radio at the receiving end, wherein a sum of a duration of the pilot signal and a duration for transmitting data to be transmitted is not greater than a data transmission duration as stipulated in Federal Communications Commission standard.

In this way, it is possible to avoid resource waste and improve efficiency.

Further, the pilot signal includes at least one of a mute signal, a subsonic signal, and a tone signal.

These signals herein are merely illustrative examples of a pilot signal. The pilot signal is not limited to the above three signals. In practical applications, a signal can be used as the pilot signal as long as it does not contain any useful data.

Further, the pilot signal is used to notify the two-way radio at the receiving end to switch off a speaker, in addition to being used to set the two-way radio at the receiving end into an operating state.

In this way, the user experience may be improved, since the sound resulting from the subsequent data received is an unpleasant noise.

In order to solve the above technical problem, the present application further provides a data receiving method in a narrow-band communication system, for data communication between a two-way radio at a transmitting end and a two-way radio at a receiving end, wherein the data receiving method comprising:

receiving, by the two-way radio at the receiving end, a pilot signal transmitted by the two-way radio at the transmitting end;

setting, by the two-way radio at the receiving end, the two-way radio at the receiving end into an operating state according to the pilot signal;

receiving, by the two-way radio at the receiving end in the operating state, data transmitted by the two-way radio at the transmitting end.

Further, a duration of the pilot signal is not less than a duration of a sleeping state of the two-way radio at the receiving end.

Further, the data receiving method further comprising: after receiving the pilot signal by the two-way radio at the receiving end, waiting for a period of time and then receiving data by the two-way radio at the receiving end, and a duration of the period of time is less than a time length for the two-way radio at the receiving end re-entering into a sleeping state from the operating state.

Further, the data receiving method further comprising: immediately after receiving the pilot signal by the two-way radio at the receiving end, receiving data by the two-way radio at the receiving end, wherein a sum of a duration of the pilot signal and a duration for receiving data is not greater than a data transmission duration as stipulated in Federal Communications Commission standard.

Further, the pilot signal includes at least one of a mute signal, a subsonic signal, and a tone signal.

Further, the pilot signal is used to notify the two-way radio at the receiving end to switch off a speaker, in addition to being used to set the two-way radio at the receiving end into an operating state.

Those skilled in the art will appreciate that the data receiving method in a narrow-band communication system according to the present application may provide corresponding technical advantages as those discussed in the data transmitting method in a narrow-band communication system.

In order to solve the above technical problem, the present application further correspondingly provides a two-way radio at a transmitting end, comprising:

a communication module for transmitting a pilot signal, the pilot signal being used to set the two-way radio at the receiving end into an operating state;

a data transmitting module for transmitting data to be transmitted to the two-way radio at the receiving end after the communication module transmits the pilot signal; and a processing module for controlling a transmitting state of the data transmitting module.

Further, a duration of the pilot signal is not less than a duration of a sleeping state of the two-way radio at the receiving end.

Further, after the communication module transmits the pilot signal and before the data transmitting module transmits data to be transmitted, the processing module switches off a transmitting state of the two-way radio at the transmitting end, and a duration for the transmitting state of the two-way radio at the transmitting end being off is less than a time length for the two-way radio at the receiving end re-entering into a sleeping state from the operating state.

Further, after the communication module transmits the pilot signal and before the data transmitting module transmits data to be transmitted, the two-way radio at the transmitting end waits for a period of time, during the period of time the processing module does not switch off the transmitting state of the two-way radio at the transmitting end, and a duration of the period of time is less than a time length for the two-way radio at the receiving end re-entering into a sleeping state from the operating state, and a sum of a duration of the pilot signal, the duration of the period of time and a duration for transmitting data to be transmitted is not greater than a data transmission duration as stipulated in Federal Communications Commission standard.

Further, immediately after the communication module transmits the pilot signal, the data transmitting module transmits data to be transmitted to the two-way radio at the receiving end, wherein a sum of a duration of the pilot signal and a duration for transmitting data to be transmitted is not greater than a data transmission duration as stipulated in Federal Communications Commission standard.

Further, the pilot signal includes at least one of a mute signal, a subsonic signal, and a tone signal.

Further, the pilot signal is used to notify the two-way radio at the receiving end to switch off a speaker, in addition to being used to set the two-way radio at the receiving end into an operating state.

Those skilled in the art will appreciate that the two-way radio at a transmitting end according to the present application may provide corresponding technical advantages as those discussed in the data transmitting method in a narrow-band communication system.

In order to solve the above technical problem, the present application further correspondingly provides a two-way radio at a receiving end, comprising:

a communication module for receiving a pilot signal;

a processing module for setting the two-way radio at the receiving end into an operating state or a sleeping state according to the pilot signal; and a data receiving module for receiving data transmitted by the two-way radio at the transmitting end in the operating state of the two-way radio at the receiving end.

Further, a duration of the pilot signal is not less than a duration of a sleeping state of the two-way radio at the receiving end.

Further, after the communication module receives the pilot signal, the data receiving module waits for a period of time and then receives data, and a duration of the period of time is less than a time length for the processing module to switch two-way radio at the receiving end from the operating state into a sleeping state.

Further, immediately after the communication module receives the pilot signal, the data receiving module receives data, wherein a sum of a duration of the pilot signal and a duration for receiving data is not greater than a data transmission duration as stipulated in Federal Communications Commission standard.

Further, the pilot signal includes at least one of a mute signal, a subsonic signal, and a tone signal.

Further, the pilot signal is used to notify the two-way radio at the receiving end to switch off a speaker, in addition to being used to set the two-way radio at the receiving end into an operating state.

Those skilled in the art will appreciate that the two-way radio at a receiving end according to the present application may provide corresponding technical advantages as those discussed in the data transmitting method in a narrow-band communication system.

In order to solve the above technical problem, the present application further provides computer readable storage medium having one or more computer programs stored thereon, the one or more computer programs being executable by one or more processors in order to carry out steps of the data transmitting method in a narrow-band communication system as described above.

In order to solve the above technical problem, the present application further provides a computer readable storage medium having one or more computer programs stored thereon, the one or more computer programs being executable by one or more processors in order to carry out steps of the data receiving method in a narrow-band communication system as described above.

Those skilled in the art will appreciate that the computer readable storage medium according to the present application may provide corresponding technical advantages as those discussed in the data transmitting method in a narrow-band communication system.

Data transmission in a narrow-band communication system as mentioned in the present application documents involves, but is not limited to, Frequency Shift Keying (FSK), Minimum Frequency Shift Keying (MSK), Amplitude Shift Keying (ASK) and other data modulation modes.

The present application generally can provide the following beneficial effects:

The present application provides data transmitting and receiving methods in a narrow-band communication system, a two-way radio and a storage medium. The general idea of the present application is as follows: the two-way radio at the transmitting end firstly transmits a pilot signal, which activates the two-way radio at the receiving end into an operating state; the two-way radio at the transmitting end, after transmitting the pilot signal, transmits data to be transmitted to the two-way radio at the receiving end; the two-way radio at the receiving end, according to the pilot signal, switches the two-way radio at the receiving end into the operating state, and in its operating state receives data transmitted by the two-way radio at the transmitting end. This ensures that the two-way radio at the receiving end may receive data from the two-way radio at the transmitting end in real time, thereby improving the accuracy of data transmitted by the two-way radio at the transmitting end.

DETAILED DESCRIPTION

The present application will be further explained by means of the embodiments below with reference to the figures.

Figure 1:
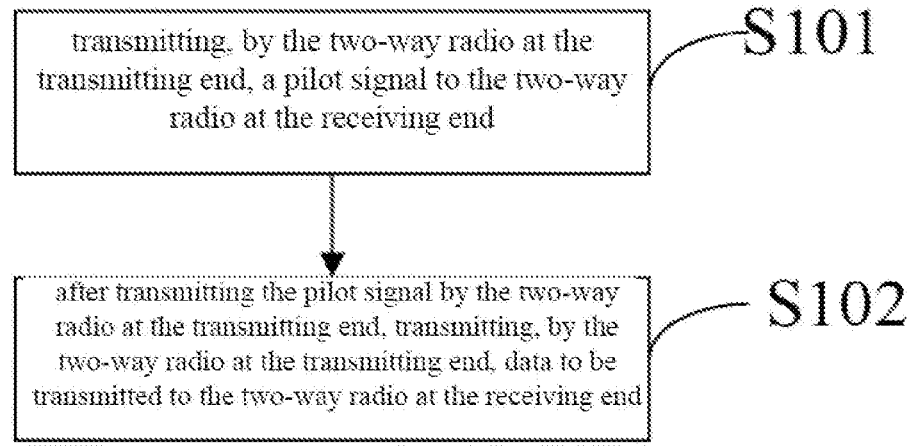
FIG. 1 is an example of a flow chart of data transmitting method in a narrow-band communication system according to the present application.
Figure 2:
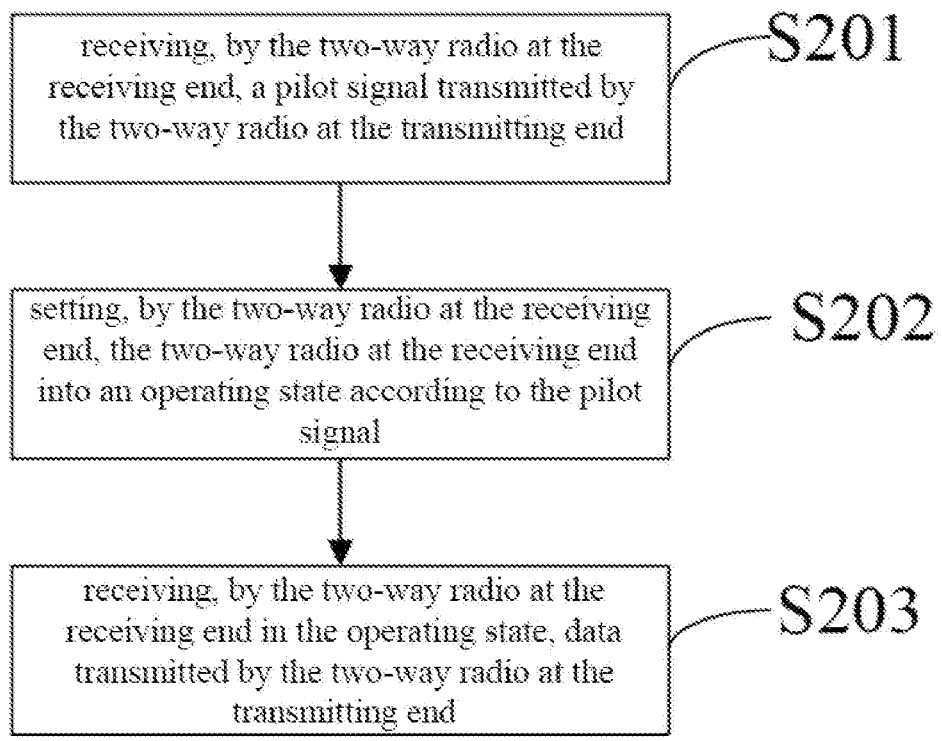
FIG. 2 is an example of a flow chart of data receiving method in a narrow-band communication system according to the present application.

FIG. 1 is an example of a flow chart of data transmitting method in a narrow-band communication system according to the present application. This method is mainly used for data communication between the two-way radios. Hereinafter, taking two two-way radios communicating with each other as an example, data transmitting method in narrow-band communication according to the present application will be described in detail. The data transmitting method in a narrow-band communication system comprises the following steps:

Step S101: transmitting, by the two-way radio at the transmitting end, a pilot signal to the two-way radio at the receiving end, the pilot signal being used to set the two-way radio at the receiving end into an operating state.

In practical applications, the communication states of the two-way radios may include an operating state and a sleeping state. "Operating state" refers to a state in which a two-way radio may receive and transmit signals. "Sleeping state" refers to an abnormal operating state into which a two-way radio, when not being operated by a user and in the meantime not receiving a valid signal, may enter, with a purpose of saving power. When a two-way radio is in the sleeping state, it will not respond to the signal or data received.

The "pilot signal" mentioned in Step S101 is used to set a two-way radio at the receiving end, when receiving data, to be in an operating state. The pilot signal includes, but is not limited to, one of a mute signal, a subsonic signal and a tone signal, or a combination thereof.

Step S102: after transmitting the pilot signal by the two-way radio at the transmitting end, transmitting, by the two-way radio at the transmitting end, data to be transmitted to the two-way radio at the receiving end.

Specifically, the two-way radio at the transmitting end, after transmitting the pilot signal, transmits data to be transmitted to the two-way radio at the receiving end, immediately or after a period of time. The period of time may be specifically determined according to actual situation.

In the data transmitting method in a narrow-band communication system according to the present application, only after the two-way radio at the receiving end is activated into the operating state by the pilot signal, the two-way radio at the transmitting end transmits data. It ensures that the two-way radio at the receiving end may receive data from the two-way radio at the transmitting end in real time, thereby improving the accuracy of data transmitted by the two-way radio at the transmitting end.

In practical applications, according to FCC standard, the two-way radio operates for a period of time and sleeps for a period of time during data transmission. In order to ensure that the pilot signal transmitted by the two-way radio at the transmitting end reliably wakes up the two-way radio at the receiving end, such that the two-way radio at the receiving end, when receiving data, is in the operating state, the time slot of the pilot signal is set to be not less than that of the sleeping state of the two-way radio at the receiving end, i.e. the duration of the pilot signal is not less than that of the sleeping state of the two-way radio at the receiving end. Accordingly, it ensures that there may always exist a moment or a period of time at or during which the two-way radio at the receiving end, when receiving the pilot signal, is in an operating state.

Figure 3:
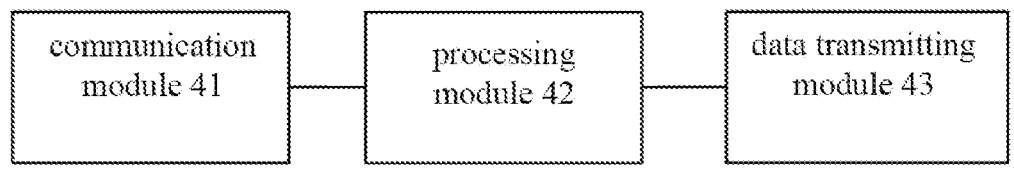
FIG. 3 is an example of a time slot diagram of data transmitted by a two-way radio at a transmitting end according to the present application.

In one embodiment, the data transmitting method further comprising: after transmitting the pilot signal and before transmitting data to be transmitted by the two-way radio at the transmitting end, switching off, by the two-way radio at the transmitting end, a transmitting state of the two-way radio at the transmitting end, and a duration for the transmitting state of the two-way radio at the transmitting end being off is less than a time length for the two-way radio at the receiving end re-entering into a sleeping state from the operating state. FIG. 3 is an example of a time slot diagram of data transmitted by a two-way radio at the transmitting end according to the present application, showing a transmission timing of the two-way radio at the transmitting end under such situation. After a period of time Twakeup during which the pilot signal is transmitted, the two-way radio at the transmitting end switches off its transmitting state for a duration Tdelay, and then transmits valid data for 1 s.

In a preferable example, the two-way radio at the transmitting end may firstly transmit a mute signal in order to wake up the two-way radio at the receiving end, wherein the duration of the mute signal should be greater than the duration of the sleeping state of the two-way radio at the receiving end. Then, the two-way radio at the transmitting end switches off its transmitting state, and the duration for the transmitting state of the two-way radio at the transmitting end being off may be adjusted according to the actual situation, but generally should be less than a time length for the two-way radio at the receiving end re-entering into a sleeping state from the operating state again. Subsequently, the two-way radio at the transmitting end transmits valid data for a period of time not greater than 1 s. In this way, it is possible to conform well to the requirement stipulated in FCC standard, i.e. a data transmission duration may be not greater than 1 s, and also secures a certain degree of accuracy of data received by the two-way radio at the receiving end and data volume transmitted by the two-way radio at the transmitting end.

That is, FCC standard (Part 95) has a time requirement (i.e. at most 1 s) as to the data transmission duration for FRS and GMRS types of two-way radios. By means of switching off the transmitting state of the two-way radio at the transmitting end for a period of time, it ensures that the subsequent data transmission duration may be as long as 1 s. Assuming that the transmitting state of the two-way radio at the transmitting end is not switched off, FCC standard may count the preceding pilot signal transmission duration into the data transmission duration (i.e. 1 s), leading to violations (a data transmission duration exceeding 1 s), or too little time for data transmission.

In addition, in order to eliminate the adverse effect of a wake-up mute signal on the two-way radio at the receiving end, the two-way radio at the transmitting end may add a certain special signal, such as a special sub-tone, to the wake-up mute signal. In this way, the two-way radio at the receiving end, upon receiving such a special signal, may switch off the speaker.

Further, it is also possible to notify the two-way radio at the receiving end to switch off the speaker by transmitting pilot signals such as one or more audible tones. Further, it is also possible to notify the two-way radio at the receiving end to switch off the speaker by transmitting other types of pilot signals.

Assuming that the speaker is not switched off, the user experience may be affected, since the sound resulting from the subsequent data received is an unpleasant noise.

Further, under the condition that a sum of the duration of pilot signal, the duration for the two-way radio at the transmitting end switching off its transmitting state and the duration for transmitting data to be transmitted is not greater than a data transmission duration as stipulated in FCC standard, the two-way radio at the transmitting end, after transmitting the pilot signal and before transmitting data to be transmitted, further waits for a period of time, during the period of time the transmitting state of the two-way radio at the transmitting end is not switched off, and a duration of the period of time is less than a time length for the two-way radio at the receiving end re-entering into a sleeping state from the operating state again. In this way, a series of problems caused by frequent disconnection of the two-way radio at the transmitting end may be avoided.

Further, under the condition that a sum of a duration of the pilot signal and a duration for transmitting data to be transmitted is not greater than a data transmission duration as stipulated in FCC standard, the two-way radio at the transmitting end, immediately after transmitting the pilot signal, transmitting data to be transmitted to the two-way radio at the receiving end. This may avoid resource waste and improve efficiency.

In this embodiment, the present application further provides a data receiving method in a narrow-band communication system, for data communication between a two-way radio at a transmitting end and a two-way radio at a receiving end, the method comprises the following steps:

Step S201: receiving, by the two-way radio at the receiving end, a pilot signal transmitted by the two-way radio at the transmitting end;

Step S202: setting, by the two-way radio at the receiving end, the two-way radio at the receiving end into an operating state according to the pilot signal;

Step S203: receiving, by the two-way radio at the receiving end in the operating state, data transmitted by the two-way radio at the transmitting end.

In one embodiment, a duration of the pilot signal is not less than a duration of a sleeping state of the two-way radio at the receiving end. In one embodiment, the data receiving method further comprising: after receiving the pilot signal by the two-way radio at the receiving end, waiting for a period of time and then receiving data by the two-way radio at the receiving end, and a duration of the period of time is less than a time length for the two-way radio at the receiving end re-entering into a sleeping state from the operating state. In one embodiment, the data receiving method further comprising: immediately after receiving the pilot signal by the two-way radio at the receiving end, receiving data by the two-way radio at the receiving end, wherein a sum of a duration of the pilot signal and a duration for receiving data is not greater than a data transmission duration as stipulated in Federal Communications Commission standard.

In one embodiment, the pilot signal includes at least one of a mute signal, a subsonic signal, and a tone signal. In one embodiment, the pilot signal is used to notify the two-way radio at the receiving end to switch off a speaker, in addition to being used to set the two-way radio at the receiving end into an operating state.

Figure 4:
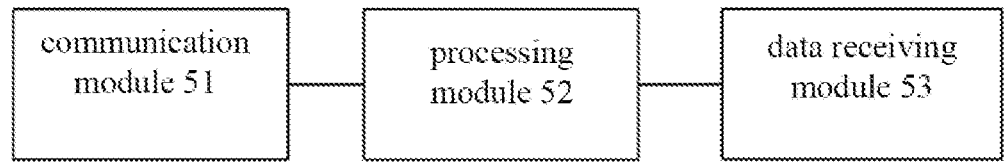
FIG. 4 is an example of a structure diagram of a two-way radio at a transmitting end according to the present application.

FIG. 4 is an example of a structure diagram of a two-way radio at a transmitting end according to the present application. The two-way radio at the transmitting end according to the present application comprises: a communication module 41 for transmitting a pilot signal, the pilot signal being used to set the two-way radio at a receiving end into an operating state; a data transmitting module 43 for transmitting data to be transmitted to the two-way radio at the receiving end after the communication module transmits the pilot signal; and a processing module 42 for controlling a transmitting state of the data transmitting module. The two-way radio at the transmitting end according to the present application has a corresponding configuration for carrying out each step of the above data transmitting method in a narrow-band communication system according to the present application.

Figure 5:
FIG. 5 is an example of a structure diagram of a two-way radio at a receiving end according to the present application.

FIG. 5 is an example of a structure diagram of a two-way radio at a receiving end according to the present application. The two-way radio at a receiving end according to the present application comprises: a communication module 51 for receiving a pilot signal; a processing module 52 for setting the two-way radio at the receiving end into an operating state or a sleeping state according to the pilot signal; and a data receiving module 53 for receiving data transmitted by the two-way radio at the transmitting end in the operating state of the two-way radio at the receiving end. The two-way radio at the receiving end according to the present application has a corresponding configuration for carrying out each step of the above data receiving method in a narrow-band communication system according to the present application.

The present application also provides a computer readable storage medium, which is a volatile or non-volatile, removable or non-removable medium for storing information, such as computer readable instructions, data structures, computer program modules, or other data. The computer readable storage medium may include, but is not limited to, a Random Access Memory (RAM), a Read-Only Memory (ROM), an Electrically Erasable Programmable Read Only Memory (EEPROM), flash memory or other memory technology, Compact Disc Read-Only Memory (CD-ROM), Digital Versatile Disc (DVD) or other optical disc storage, magnetic box, magnetic tape, disk storage or other magnetic storage device, or any other medium that may be used to store desired information and that can be accessed by computers.

In one example, the computer readable storage medium may be used to store one or more computer programs, which may be executed by one or more processors to implement the steps of the data transmitting method in a narrow-band communication system or the steps of the data receiving method in a narrow-band communication system as in the above embodiments.

This embodiment further provides a computer program (or referred to as computer software), which may be distributed on a computer readable medium, and may be executed by a computing device to implement at least one step of the data transmitting method in a narrow-band communication system or at least one step of the data receiving method in a narrow-band communication system as shown in the above embodiments; and in some cases, at least one of the steps shown or described may be performed in a sequence different from that described in the above embodiments.

The present application further provides a computer program product comprising a computer readable device having a computer program as described above stored thereon. The computer readable device in this embodiment can include a computer readable storage medium as described above.

In practical applications, the computer readable storage medium may specifically be an embedded CPU program, i.e. the computer readable storage medium is written into the embedded CPU by a writing software, and then a two-way radio is provided in the CPU with the computer readable storage medium to implement the data transmitting and receiving methods described above.

Those skilled in the art should appreciate that all or some of the steps in the methods, the systems, and the functional blocks/units in the devices disclosed above may be implemented as software (which may be implemented by computer program codes executable by a computing device), firmware, hardware, and suitable combinations thereof. In a hardware implementation, the division between functional modules/units mentioned in the above description does not necessarily correspond to the division of physical components; for example, one physical component may have multiple functions, or one function or step may be executed by several physical components in cooperation. Some or all of the physical components may be implemented as software executed by a processor, such as a central processor, a digital signal processor, or a microprocessor, or may be implemented as hardware, or may be implemented as an integrated circuit, such as an application-specific integrated circuit.

Moreover, it is well known to those skilled in the art that communication media typically may include computer readable instructions, data structures, computer program modules or other data in a modulated data signal, such as a carrier wave or other transport mechanism, and may include any information delivery medium. Therefore, the present application is not limited to any particular combination of hardware and software.

The above is only an exemplary description of the present application, and is not intended to impose any formal limitation on the present application. Any simple modification, equivalent change, combination or variation made to the above embodiments in accordance with the technical essence of the present application still falls within the protection scope of the technical solution of the present application.

The invention claimed is:

1. A data transmitting method in a narrow-band communication system, for data communication between a two-way radio at a transmitting end and a two-way radio at a receiving end, wherein the data transmitting method comprising:

transmitting, by the two-way radio at the transmitting end, a pilot signal to the two-way radio at the receiving end, the pilot signal being used to set the two-way radio at the receiving end into an operating state; and after transmitting the pilot signal by the two-way radio at the transmitting end, transmitting, by the two-way radio at the transmitting end, data to be transmitted to the two-way radio at the receiving end;

wherein the data transmitting method further comprising:
after transmitting the pilot signal and before transmitting data to be transmitted by the two-way radio at the transmitting end, waiting for a period of time by the two-way radio at the transmitting end, during the period of time the transmitting state of the two-way radio at the transmitting end is not switched off, and a duration of the period of time is less than a time length for the two-way radio at the receiving end re-entering into a sleeping state from the operating state, and a sum of a duration of the pilot signal, the duration of the period of time and a duration for transmitting data to be transmitted is not greater than a data transmission duration as stipulated in Federal Communications Commission standard.

2. The data transmitting method in a narrow-band communication system as claimed in claim 1, wherein the duration of the pilot signal is not less than a duration of a sleeping state of the two-way radio at the receiving end.

3. The data transmitting method in a narrow-band communication system as claimed in claim 1, wherein the data transmitting method further comprising: after transmitting the pilot signal and before transmitting data to be transmitted by the two-way radio at the transmitting end, switching off, by the two-way radio at the transmitting end, a transmitting state of the two-way radio at the transmitting end, and a duration for the transmitting state of the two-way radio at the transmitting end being off is less than a time length for the two-way radio at the receiving end re-entering into a sleeping state from the operating state.

4. The data transmitting method in a narrow-band communication system as claimed in claim 1, wherein the data transmitting method further comprising: immediately after transmitting the pilot signal by the two-way radio at the transmitting end, transmitting, by the two-way radio at the transmitting end, data to be transmitted to the two-way radio at the receiving end, wherein a sum of the duration of the pilot signal and the duration for transmitting data to be transmitted is not greater than the data transmission duration as stipulated in Federal Communications Commission standard.

5. The data transmitting method in a narrow-band communication system as claimed in claim 1, wherein the pilot signal includes at least one of a mute signal, a subsonic signal, and a tone signal, and the pilot signal is used to notify the two-way radio at the receiving end to switch off a speaker, in addition to being used to set the two-way radio at the receiving end into an operating state.

6. A computer readable storage medium having one or more computer programs stored thereon, the one or more computer programs being executable by one or more processors in order to carry out steps of the data transmitting method in a narrow-band communication system as claimed in claim 1.

7. A data receiving method in a narrow-band communication system, for data communication between a two-way radio at a transmitting end and a two-way radio at a receiving end, wherein the data receiving method comprising:
receiving, by the two-way radio at the receiving end, a pilot signal transmitted by the two-way radio at the transmitting end;
setting, by the two-way radio at the receiving end, the two-way radio at the receiving end into an operating state according to the pilot signal; and
receiving, by the two-way radio at the receiving end in the operating state, data transmitted by the two-way radio at the transmitting end;
wherein the data receiving method further comprising:
after receiving the pilot signal by the two-way radio at the receiving end, waiting for a period of time and then receiving data by the two-way radio at the receiving end, and a duration of the period of time is less than a time length for the two-way radio at the receiving end re-entering into a sleeping state from the operating state, and a sum of a duration of the pilot signal, the duration of the period of time and a duration for receiving data is not greater than a data transmission duration as stipulated in Federal Communications Commission standard.

8. The data receiving method in a narrow-band communication system as claimed in claim 7, wherein the duration of the pilot signal is not less than a duration of a sleeping state of the two-way radio at the receiving end.

9. The data receiving method in a narrow-band communication system as claimed in claim 7, wherein the data receiving method further comprising: immediately after receiving the pilot signal by the two-way radio at the receiving end, receiving data by the two-way radio at the receiving end, wherein a sum of the duration of the pilot signal and the duration for receiving data is not greater than the data transmission duration as stipulated in Federal Communications Commission standard.

10. The data receiving method in a narrow-band communication system as claimed in claim 7, wherein the pilot signal includes at least one of a mute signal, a subsonic signal, and a tone signal, and the pilot signal is used to notify the two-way radio at the receiving end to switch off a speaker, in addition to being used to set the two-way radio at the receiving end into an operating state.

11. A computer readable storage medium having one or more computer programs stored thereon, the one or more computer programs being executable by one or more processors in order to carry out steps of the data receiving method in a narrow-band communication system as claimed in claim 7.

12. A two-way radio at a transmitting end, comprising:
a communication module for transmitting a pilot signal, the pilot signal being used to set the two-way radio at a receiving end into an operating state;
a data transmitting module for transmitting data to be transmitted to the two-way radio at the receiving end after the communication module transmits the pilot signal; and
a processing module for controlling a transmitting state of the data transmitting module;
wherein after the communication module transmits the pilot signal and before the data transmitting module transmits data to be transmitted, the two-way radio at the transmitting end waits for a period of time, during the period of time the processing module does not switch off the transmitting state of the two-way radio at the transmitting end, and a duration of the period of time is less than a time length for the two-way radio at the receiving end re-entering into a sleeping state from the operating state, and a sum of a duration of the pilot signal, the duration of the period of time and a duration for transmitting data to be transmitted is not greater than a data transmission duration as stipulated in Federal Communications Commission standard.

13. The two-way radio at a transmitting end as claimed in claim 12, wherein the duration of the pilot signal is not less than a duration of a sleeping state of the two-way radio at the receiving end.

14. The two-way radio at a transmitting end as claimed in claim 12, wherein after the communication module transmits the pilot signal and before the data transmitting module transmits data to be transmitted, the processing module switches off a transmitting state of the two-way radio at the transmitting end, and a duration for the transmitting state of the two-way radio at the transmitting end being off is less than a time length for the two-way radio at the receiving end re-entering into a sleeping state from the operating state.

15. The two-way radio at a transmitting end as claimed in claim 12, wherein immediately after the communication module transmits the pilot signal, the data transmitting module transmits data to be transmitted to the two-way radio at the receiving end, wherein a sum of the duration of the pilot signal and the duration for transmitting data to be transmitted is not greater than the data transmission duration as stipulated in Federal Communications Commission standard.

16. The two-way radio at a transmitting end as claimed in claim 12, wherein the pilot signal includes at least one of a mute signal, a subsonic signal, and a tone signal, and the pilot signal is used to notify the two-way radio at the receiving end to switch off a speaker, in addition to being used to set the two-way radio at the receiving end into an operating state.

17. A two-way radio at a receiving end, comprising:
a communication module for receiving a pilot signal;
a processing module for setting the two-way radio at the receiving end into an operating state or a sleeping state according to the pilot signal; and
a data receiving module for receiving data transmitted by the two-way radio at the transmitting end in the operating state of the two-way radio at the receiving end;
wherein after the communication module receives the pilot signal, the data receiving module waits for a period of time and then receives data, and a duration of the period of time is less than a time length for the processing module to switch the two-way radio at the receiving end from the operating state into a sleeping state, and a sum of a duration of the pilot signal, the duration of the period of time and a duration for receiving data is not greater than a data transmission duration as stipulated in Federal Communications Commission standard.

18. The two-way radio at a receiving end as claimed in claim 17, wherein the duration of the pilot signal is not less than a duration of a sleeping state of the two-way radio at the receiving end.

19. The two-way radio at a receiving end as claimed in claim 17, wherein immediately after the communication module receives the pilot signal, the data receiving module receives data, wherein a sum of the duration of the pilot signal and the duration for receiving data is not greater than the data transmission duration as stipulated in Federal Communications Commission standard.

20. The two-way radio at a receiving end as claimed in claim 17, wherein the pilot signal includes at least one of a mute signal, a subsonic signal, and a tone signal, and the pilot signal is used to notify the two-way radio at the receiving end to switch off a speaker, in addition to being used to set the two-way radio at the receiving end into an operating state.

* * * * *